US010921273B2

(12) United States Patent
Hamouda et al.

(10) Patent No.: US 10,921,273 B2
(45) Date of Patent: Feb. 16, 2021

(54) APPARATUS FOR MEASURING THE EFFECTIVE THERMAL CONDUCTIVITY OF PACKED BED OF AGGREGATES

(71) Applicant: QATAR UNIVERSITY, Doha (QA)

(72) Inventors: Abdel Magid Hamouda, Doha (QA); Khaled Ibrahim ElSayed Ahmed, Doha (QA); Seyed Sajad Mirjavadi, Doha (QA); Mohamed Gadala, Doha (QA)

(73) Assignee: QATAR UNIVERSITY, Doha (QA)

( * ) Notice: Subject to any disclaimer, the term of this patent is extended or adjusted under 35 U.S.C. 154(b) by 251 days.

(21) Appl. No.: 16/055,756

(22) Filed: Aug. 6, 2018

(65) Prior Publication Data

US 2019/0056339 A1    Feb. 21, 2019

Related U.S. Application Data

(60) Provisional application No. 62/545,721, filed on Aug. 15, 2017.

(51) Int. Cl.
*G01N 25/18*  (2006.01)
*G01N 25/00*  (2006.01)

(52) U.S. Cl.
CPC ............ *G01N 25/18* (2013.01); *G01N 25/00* (2013.01)

(58) Field of Classification Search
CPC ......... G01N 25/18; G01N 25/00; G01K 13/10
See application file for complete search history.

(56) References Cited

U.S. PATENT DOCUMENTS

| 5,161,889 | A  | * | 11/1992 | Smith | A21B 1/245 |
| | | | | | 219/399 |
| 5,940,784 | A  | * | 8/1999 | El-Husayni | G01N 25/18 |
| | | | | | 374/43 |
| 6,203,191 | B1 | * | 3/2001 | Mongan | G01K 7/42 |
| | | | | | 374/20 |
| 6,783,368 | B2 | * | 8/2004 | Prasad | G01N 25/18 |
| | | | | | 434/276 |
| 9,625,399 | B2 | * | 4/2017 | Zuniga Escobar | G01N 25/18 |
| 10,323,991 | B2 | * | 6/2019 | Beck | G01K 1/024 |
| 2002/0006152 | A1 | * | 1/2002 | Prasad | G09B 23/16 |
| | | | | | 374/44 |

(Continued)

*Primary Examiner* — Nathaniel T Woodward
*Assistant Examiner* — Philip L Cotey
(74) *Attorney, Agent, or Firm* — Squire Patton Boggs (US) LLP (57) ABSTRACT

Systems and methods for measuring the effective thermal conductivity of aggregate packed beds are described. Systems and methods may include an apparatus comprising a first assembly, a second assembly, and a cylindrical insulator. The first assembly may include a first faucet, a first brass cover, a first heat exchanger body, and a first aluminum plate. The second assembly may include a second faucet, a second brass cover, a second heat exchanger body, and a second aluminum plate. The first assembly and the second assembly may be placed into opposite ends of the cylindrical insulator. Aggregates may be placed inside the cylindrical insulator between the first and second assemblies. Temperature may be measured at a variety of points of contact on the two faces of a low thermal conductivity plate, and heat flux and effective thermal conductivity of packed bed of aggregates may be calculated.

8 Claims, 5 Drawing Sheets

(56) References Cited

U.S. PATENT DOCUMENTS

| | | | | |
|---|---|---|---|---|
| 2005/0061473 A1* | 3/2005 | Fletcher | ............... | F28D 9/0087 165/46 |
| 2009/0296772 A1* | 12/2009 | Choi | ..................... | G01N 25/18 374/43 |
| 2011/0299563 A1* | 12/2011 | Zuniga Escobar | .... | G01N 25/18 374/44 |
| 2012/0230877 A1* | 9/2012 | Pinchot | ............. | B01D 67/0039 422/128 |
| 2013/0118706 A1* | 5/2013 | Kareh | .................... | G01N 25/18 165/11.1 |
| 2017/0336270 A1* | 11/2017 | Beck | ....................... | G01K 1/16 |

* cited by examiner

APPARATUS FOR MEASURING THE EFFECTIVE THERMAL CONDUCTIVITY OF PACKED BED OF AGGREGATES

CROSS REFERENCE TO RELATED APPLICATION

This application is related to and claims the priority of U.S. Provisional Patent Application No. 62/545,721, filed on Aug. 15, 2017, which is hereby incorporated herein by reference in its entirety.

FIELD OF THE INVENTION

The present invention relates to systems and methods for measuring thermal conductivity of packed beds of aggregates, packed beds of granular materials, and packed beds of homogenous mixtures.

BACKGROUND OF THE INVENTION

Embodiments of the present invention solve many of the problems and/or overcome many of the drawbacks and disadvantages of the prior art by providing systems and methods for measuring thermal conductivity of packed bed of materials.

Thermal conductivity characterizes the ability of a material to conduct heat. Traditional methods for measuring the thermal conductivity of materials comprise imposing a temperature gradient upon a material of known geometry, and measuring the heat flow through the material. The heat flow is measured by, for example, measuring the temperature drop across a sheet of known thermal conductivity.

The effective thermal conductivity of a material consisting of multiple components depends on the geometrical configuration of the components as well as on the thermal conductivity of each. The thermal properties of a material, for example, specific heat, thermal conductivity, and thermal diffusiveness, vary based on the type of material.

There are a number of ways to measure thermal conductivity. Each of these ways is suitable for a limited range of materials, depending on the thermal properties and the temperature of the medium. For instance, many practitioners in the art have proposed various methods for measuring thermal conductivity that require use of a known material, or samples that are homogenous. Unfortunately, none of these methods is suitable for measuring the effective thermal conductivity of packed bed of aggregates for a variety of reasons. For example, in a solid medium, the heat transfers through the solid cross section. However, in packed beds, the heat transfers through localized contact points between each aggregate and its neighbors. This heat transfer mechanism reduces the effective thermal conductivity of the packed bed compared to its solid pack value. For example, the thermal conductivity of a solid pack of limestone is 2.0 W/mK, while the effective thermal conductivity of a packed bed of limestone aggregate with a porosity of 25% is about 0.15.

At best, the existing devices are only suitable for measuring the thermal conductivity of solid materials or for very fine granular materials like powders, such as those with less than 1.0 mm diameter.

To date, there is no device suitable to measure the thermal conductivity of a homogeneous mixture with any size of substances mixed. Furthermore, there is no device capable of measuring the conductivity of aggregates with various constituents and different values of porosity and humidity. For this reason, it is highly desirable to provide an apparatus that overcomes such limitations.

SUMMARY OF THE INVENTION

According to certain embodiments, an apparatus may include a first assembly. The first assembly may include a first faucet, a first brass cover, a first heat exchanger body, and a first aluminum plate. The apparatus may also include a second assembly. The second assembly may include a second faucet, a second brass cover, a second heat exchanger body, and a second aluminum plate. The apparatus may further include a cylindrical insulator, wherein the first assembly and the second assembly may be placed into opposite ends of the cylindrical insulator.

In an embodiment, the first brass cover and the first heat exchanger body may be connected together with bolts, and the second brass cover and the second heat exchanger body may be connected together with bolts. In another embodiment, an aggregate may be placed inside the cylindrical insulator between the first assembly and the second assembly. In another embodiment, the first heat exchanger body may include internal fins, and the second heat exchanger body may include internal fins.

According to an embodiment, a first water outlet tap may be connected to the first brass cover and transfers fluid from the first heat exchanger body to a first heat pump, and a second water outlet tap may be connected to the second brass cover and transfers fluid from the second heat exchanger body to a second heat pump. In another embodiment, the first assembly may include a first conductivity plate, and the second assembly may include a second conductivity plate. The first conductivity plate may be placed between the first aluminum plate and the first heat exchanger body, and the second conductivity plate may be placed between the second aluminum plate and the second heat exchanger body.

In an embodiment, a first plate and a second plate may be attached to opposite surfaces of the first conductivity plate of the first assembly, and a third plate and a fourth plate may be attached to opposite surfaces of the second conductivity plate. In another embodiment, the first plate may serve as a contact face between a heating heat exchanger and an aggregates, and the third plate may serve as a contact face between a cooling heat exchanger and the aggregate.

According to certain embodiments, a method may include placing a first heat exchanger assembly inside a first end of a cylindrical insulator. The method may also include placing aggregate inside the cylindrical insulator through a second end of the cylindrical insulator, placing a second heat exchanger assembly inside the second end of the cylindrical insulator. The method may further include monitoring and recording the temperature of the first heat exchanger assembly and the second heat exchanger assembly at various points on plates of the first heat exchanger assembly and second heat exchanger assembly until the temperature of the first heat exchanger assembly and second heat exchanger assembly is equal. Further, the method may include calculating heat flux.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention.

DETAILED DESCRIPTION

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Systems and methods are described for using various tools and procedures for measuring the effective thermal conductivity of granular materials like concrete aggregates, powders, and the like. The examples described herein are for illustrative purposes only. The systems and methods described herein may be used for many different industries and purposes, including use in the construction industry, food industry and/or other industries. In particular, the systems and methods may be used for any industry or purpose where measuring thermal conductivity of granular beds is desired.

An apparatus comprises a first assembly, a second assembly, and a cylindrical insulator. The first assembly comprises a first faucet, a first brass cover, a first heat exchanger body, and a first aluminum plate. The second assembly comprises a second faucet, a second brass cover, a second heat exchanger body, and a second aluminum plate. The first assembly and the second assembly are placed into opposite ends of the cylindrical insulator.

Figure 1:
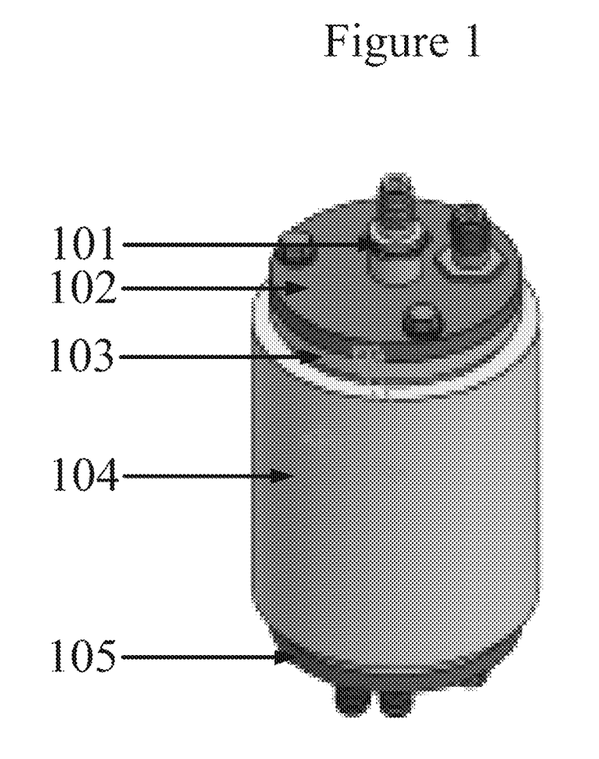
FIG. 1 illustrates an exemplary apparatus for measuring thermal conductivity without hoses according to certain embodiments.

FIG. 1 shows the exterior of an exemplary apparatus. It may be appreciated that the apparatus constitutes a faucet 101 to which a hose is connected exterior to the apparatus, a cover 102, a heat exchanger body 103, a cylindrical insulator 104, and a bottom assembly 105. The apparatus may also constitute a water inlet tap 106 (not shown) and a water outlet tap 107 (not shown). The apparatus may also constitute a heat exchanger body 103 (not shown), which holds water inlet tap 106 and water outlet tap 107, as well as a heat pump 108 (not shown). Cover 102 may be used to cover and seal heat exchanger body 103. Cover 102 may be composed of one material or a variety of materials, including aluminum, brass, and/or copper. Tap 103 may be composed of one material or a variety of materials, including aluminum, brass, and/or copper. Heat exchanger body 103 may be composed of one material or a variety of materials, including aluminum, brass, and/or copper, and may include internal fins to enhance its heat exchanging efficiency. Water outlet tap 107 may be connected to cover 102 to transfer fluid from heat exchanger body 103 to heat pump 108.

Figure 2:
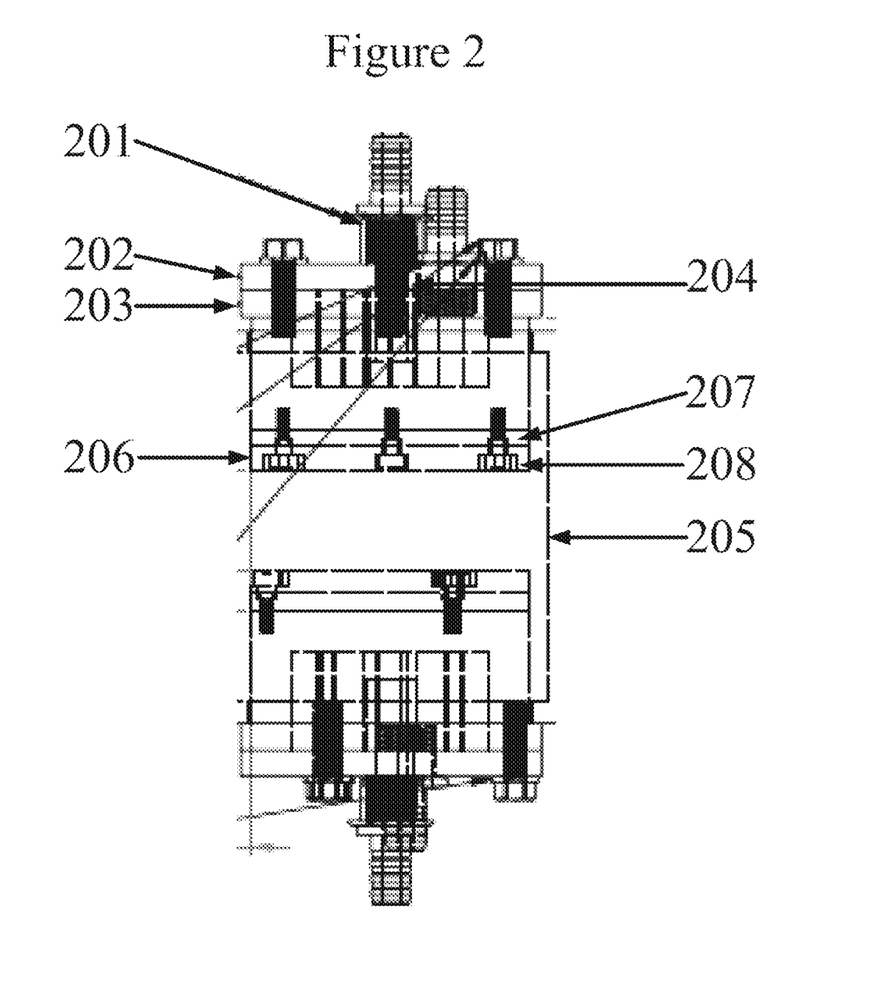
FIG. 2 illustrates a cross-section of an exemplary apparatus for measuring thermal conductivity without hoses according to certain embodiments.

FIG. 2 shows a breakdown of the exemplary apparatus shown in FIG. 1. The apparatus may have a first assembly comprising a faucet 201 to which a hose may be connected exterior to the apparatus, a cover 202, and a heat exchanger body 203, which may be connected together via one or more bolts 204. The first assembly may also contain a plate 206 that is attached to heat exchanger body 203 at the end opposite of cover 202, where plate 206 is connected to heat exchanger body 203 via additional bolts. The first assembly may be placed into the opening at a first end of a cylindrical insulator 205. A second assembly may also formed of a similar faucet, brass cover, heat exchanger body, and aluminum plate, and placed into the cylindrical insulator 205 at the end opposite of the first assembly. The apparatus may also comprise a low thermal conductivity plate 207, which includes at least two faces, and a plate 208. Low thermal conductivity plate 207 may be composed of one material or a variety of materials, including poly(methyl methacrylate), acrylic, polycarbonate, polytetrafluoroethylene, steel, or a variety of polymers and/or thermoplastics such as polyethylene, polypropylene, polystyrene, polyvinyl and/or Artylon. Plate 208 may be composed of one or a variety of materials, including aluminum, brass, and/or copper or other material with high thermal conductivity, and may depend on the thickness of plate 208. Low thermal conductivity plate 207 may be placed between plate 208 and heat exchanger body 203. Additionally, plate 208 may evenly distribute heat from plate 208 to an aggregate, such as sand or soil. The apparatus may also comprise a hot plate 209 (not shown) and a cold plate 210 (not shown). One or both of hot plate 209 and cold plate 210 may be attached to opposite surfaces of low thermal conductivity plate 207. Hot plate 209 may serve as a contact face between a heating heat exchanger and the aggregate. Cold plate 210 may serve as a contact face between a cooling heat exchanger and the aggregate.

Plate 208 may be attached to low thermal conductivity plate 207 in a variety of ways, for example, affixing with bolts made of poly(methyl methacrylate), acrylic, polycarbonate, polytetrafluoroethylene, steel, or a variety of polymers and/or thermoplastics such as polyethylene, polypropylene, polystyrene, polyvinyl and/or Artylon. The material used to affix plate 208 to low thermal conductivity plate 207 may be to minimize or maximize the heat flux. One purpose of low thermal conductivity plate 207 may be to decrease the temperature, which may be determined by measuring the temperature of the two faces of low thermal conductivity plate 207.

Figure 3:
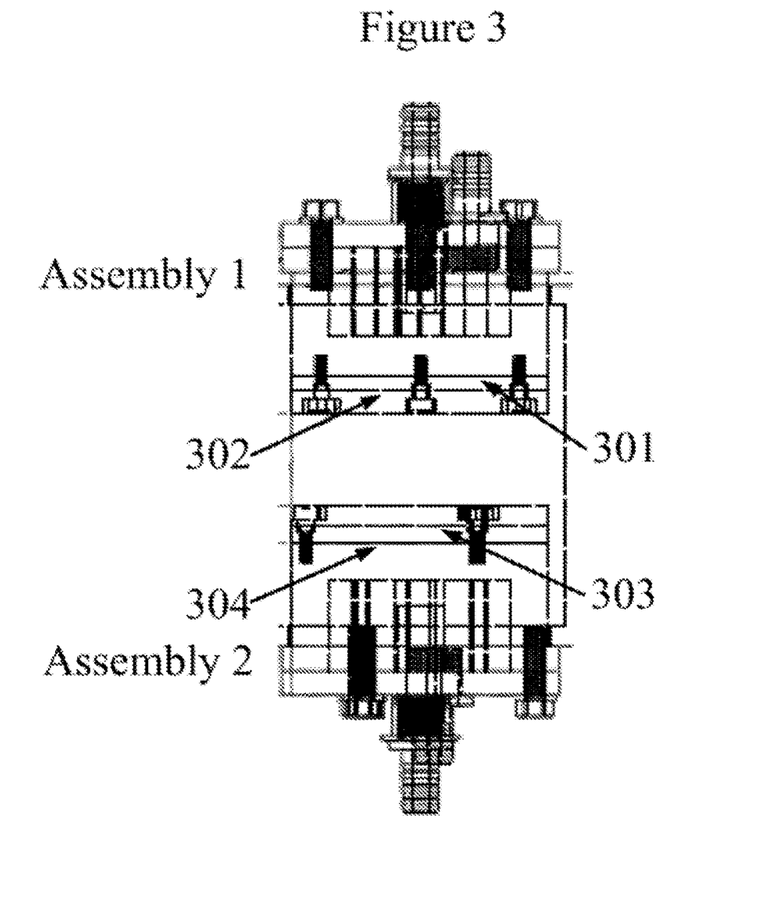
FIG. 3 illustrates a cross-section of a first assembly and a second assembly according to certain embodiments.

FIG. 3 shows a cross section of a first assembly and a second assembly. Temperature may be measured at a variety of points of contact on the two faces of low thermal conductivity plate 207 of FIG. 2, for example, points 301, 302, 303, and 304, as illustrated in FIG. 3. Additionally, a circular insulator may be attached to both assembly 1 and assembly 2.

After measuring the temperature at various points, heat flux may be calculated using the following formula:

$$\phi_q = 0.5 \times (((T_1-T_2)/H/KA) + ((T_3-T_4)/H/KA)), \text{ where:}$$

$\phi_q$ denotes the heat flux,
H denotes the thickness of the low thermal conductivity plate, K denotes a constant, and A denotes the area of the low thermal conductivity plate.

Figure 4:
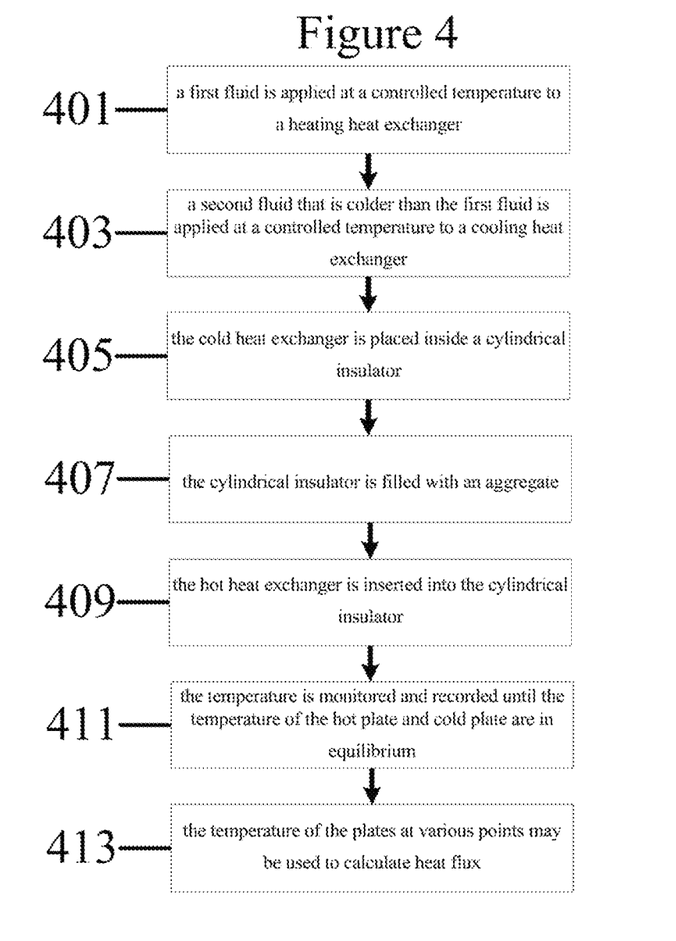
FIG. 4 illustrates an example of a method according to certain embodiments.

FIG. 4 illustrates an example of a method according to certain embodiments. In particular, FIG. 4 illustrates a flow chart of the process of measuring temperature. In step 401, a first fluid is applied at a controlled temperature to a heating heat exchanger. In step 403, a second fluid that is colder than the first fluid is applied at a controlled temperature to a cooling heat exchanger. As a result, heat will transfer from a hot plate to a cold plate, causing a temperature difference between the hot and cold plate to occur. In step 405, the cold head exchanger is placed inside a cylindrical insulator. In step 407, the cylindrical insulator is filled with an aggregate, such as sand or soil. In step 409, the hot heat exchanger is inserted into the cylindrical insulator. In step 411, the temperature is monitored and recorded until the temperature of the hot plate and cold plate are in equilibrium. In step 413, the temperature of the plates at various points may be used to calculate heat flux using the following formula:

$$\phi_q = (T_1 - T_2)/HKA, \text{ where:}$$

$\phi_q$ denotes the heat flux,

H denotes the height of a transparent plate,

K denotes a constant of the transparent plate, and

A denotes the area of the transparent plate.

In some embodiments, the measured conductivity ranges between 0.025-2.0 W/mK. In some embodiments, the maximum expected measured value for a solid aggregate is 2.0 W/mK. In some embodiments, the minimum expected measured value for air is 0.025 W/mK. In some embodiments, distributor plate conductivity ranges from 1-16 W/mK. Calculations may be based upon the difference in plate face temperatures, and may be measurable to within an accuracy of a thermocouple.

In some embodiments, the temperature difference for some combinations of thermal conductivities of distributor plates with expected effective thermal conductivities of measured aggregate beds are provided in Table 1.

|  |  | Distributor Plate Thermal Conductivity | | | | |
| --- | --- | --- | --- | --- | --- | --- |
|  |  | 16 | 8 | 4 | 2 | 1 |
| Measured | 2 | 5 | 8.4 | 12.5 | 16.67 | 20 |
| Conductivity | 1 | 2.8 | 5 | 8.4 | 12.5 | 16.67 |
|  | 0.5 | 1.5 | 2.8 | 5 | 8.4 | 12.5 |
|  | 0.25 | 0.8 | 1.5 | 2.8 | 5 | 8.4 |
|  | 0.125 | 0.4 | 0.8 | 1.5 | 2.8 | 5 |
|  | 0.0625 | 0.2 | 0.4 | 0.8 | 1.5 | 2.8 |
|  | 0.03125 | 0.1 | 0.2 | 0.4 | 0.8 | 1.5 |

Figure 5:
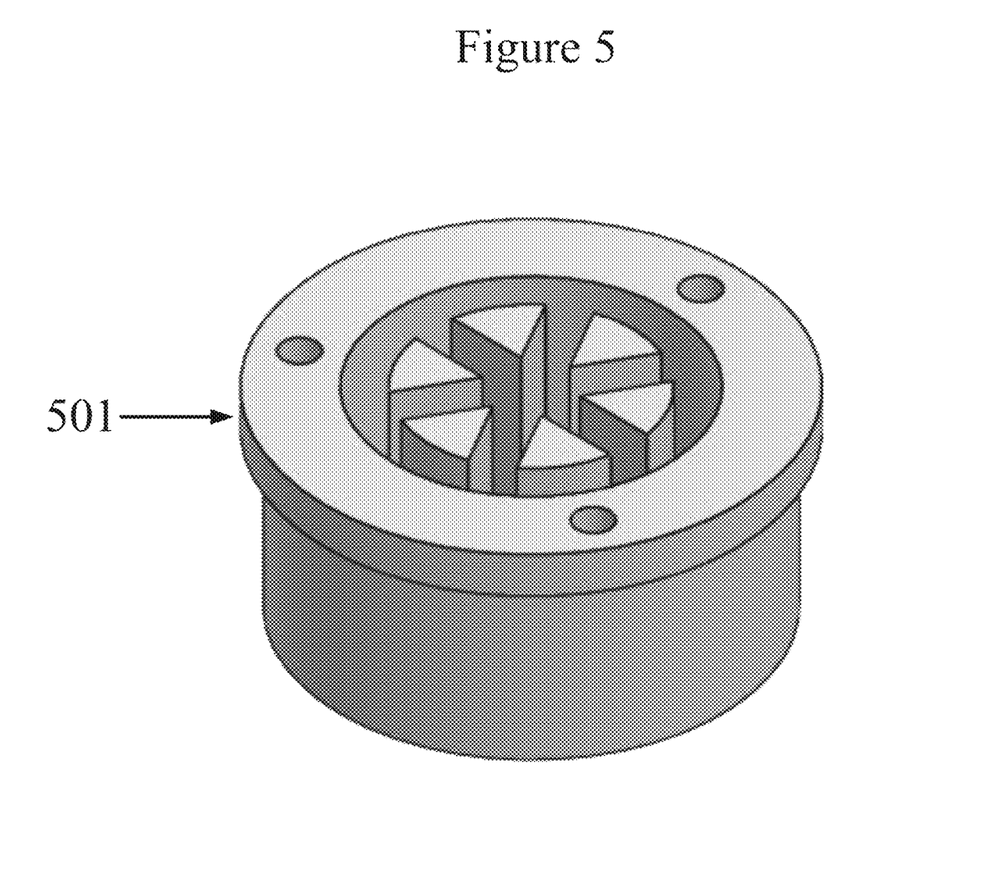
FIG. 5 illustrates an example of a plate.

FIG. 5 illustrates an example of a plate 501. Plate 501 may serve as a hot plate and/or a cold plate, and may be attached to low thermal conductivity plate 207, as illustrated in FIG. 2.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
    a first assembly, comprising:
        a first faucet;
        a first brass cover comprising a surface to which the first faucet is connected;
        a first heat exchanger body connected to the first brass cover via one or more bolts; and
        a first aluminum plate attached to the first heat exchanger body at an end opposite the first brass cover, wherein the first aluminum plate is attached to the first heat exchanger body via one or more additional bolts;
    a second assembly, comprising:
        a second faucet;
        a second brass cover comprising a surface to which the second faucet is connected;
        a second heat exchanger body connected to the second brass cover via one or more bolts; and
        a second aluminum plate attached to the second heat exchanger body at an end opposite the second brass cover, wherein the second aluminum plate is attached to the second heat exchanger body via one or more additional bolts; and
    a cylindrical insulator, wherein the first assembly and the second assembly are placed into opposite ends of the cylindrical insulator.

2. The apparatus of claim 1, wherein an aggregate is placed inside the cylindrical insulator between the first assembly and the second assembly.

3. The apparatus of claim 1, wherein the first heat exchanger body comprises internal fins, and the second heat exchanger body comprises internal fins.

4. The apparatus of claim 1, wherein a first water outlet tap is connected to the first brass cover and transfers fluid from the first heat exchanger body to a first heat pump, and a second water outlet tap is connected to the second brass cover and transfers fluid from the second heat exchanger body to a second heat pump.

5. The apparatus of claim 1, wherein the first assembly includes a first conductivity plate, and the second assembly includes a second conductivity plate, wherein the first conductivity plate is placed between the first aluminum plate and the first heat exchanger body, and the second conductivity plate is placed between the second aluminum plate and the second heat exchanger body.

6. The apparatus of claim 5, wherein a first plate and a second plate are attached to opposite surfaces of the first conductivity plate of the first assembly, and a third plate and a fourth plate are attached to opposite surfaces of the second conductivity plate.

7. The apparatus of claim 6, wherein the first plate serves as a contact face between a heating heat exchanger and an aggregate, and the third plate serves as a contact face between a cooling heat exchanger and the aggregate.

8. A method, comprising:
   placing a first heat exchanger assembly having a first starting temperature inside a first end of a cylindrical insulator;
   placing aggregate inside the cylindrical insulator through a second end of the cylindrical insulator;
   placing a second heat exchanger assembly having a second starting temperature greater than the first temperature inside the second end of the cylindrical insulator;
   monitoring and recording the temperature of the first heat exchanger assembly and the second heat exchanger assembly at various points on plates of the first heat exchanger assembly and second heat exchanger assembly until the temperature of the first heat exchanger assembly and second heat exchanger assembly is equal; and
   calculating heat flux across the aggregate based on the monitored and recorded temperature of the first heat exchanger assembly and the second heat exchanger assembly.

* * * * *